Feb. 26, 1935.  F. A. HANSON ET AL  1,992,699
SAND AND DIRT TRAP
Filed May 13, 1931   2 Sheets-Sheet 1

Inventors
FLOYD A. HANSON.
FRANK H. LEWIS

Feb. 26, 1935.  F. A. HANSON ET AL  1,992,699
SAND AND DIRT TRAP
Filed May 13, 1931  2 Sheets-Sheet 2

Inventors
FLOYD A. HANSON.
FRANK H. LEWIS.

By
Attorney

Patented Feb. 26, 1935

1,992,699

UNITED STATES PATENT OFFICE 1,992,699

SAND AND DIRT TRAP

Floyd A. Hanson and Frank H. Lewis, San Jose, Calif., assignors to Food Machinery Corporation, San Jose, Calif., a corporation of Delaware Application May 13, 1931, Serial No. 537,190

5 Claims. (Cl. 210—43)

This invention relates to a sand and dirt trap for use in the bottoms of tanks and is especially adapted to be used in the bottoms of tanks used in spraying outfits as well as tanks for washing fruits and vegetables.

In the spray pump outfits for handling spray material for spraying trees and shrubs, chemicals of a more or less oxidizing nature are used, and there is more or less of sediment contained therein which will find its way into the spray nozzles and interfere with their operation unless it is screened from the suction line going to the pumps wherein it also causes trouble by wearing the piston valves and cup rubbers.

Ordinary screens have been used quite generally to screen out the fine sand and sediment to prevent this material from effecting the proper operation of the devices by getting into the pressure lines and pumps, but since the screens were so located that the sediment accumulated around the immersed screens more or less found its way through the meshes and did damage to the devices, and in time, if the sediment was not removed would completely block the screens and create so much suction thereby that more and larger pieces of the sediment were carried through the screens to do damage to the pumps and fittings.

Applicants have found that by placing a well in the bottom of the tank around the valve and below the end of the suction pipe that the residue has a tendency to settle in the well and thus keep the area around the screen free from sediment and thus the pumps and valve rubbers are protected from undue abrasion and wear very much longer before needing repairs or replacement.

It has also been found that some easy means for removing the screen and valve was desirable to facilitate cleaning at sufficient intervals to keep the solutions clean and the screen in proper working condition. Applicants have accomplished this by mounting the screen on the lower end of a riser pipe through which the valve stem extends with a pivoted handle on the top for controlling the seating and opening of the valve. This riser pipe extends up through the tank to a special mounting disk at the top and with a hole in the tank large enough to permit pulling the riser pipe, screen and valve out for cleaning purpose, and replacement without in any manner disturbing the rest of the tank or attachments.

Residue that settles in the well is cleaned out by a suitable clamped on cap that is easily removed for the purpose.

The trap or well is constructed in combination with the suction pipe leading to the pump and so designed that the liquid is drawn through the screen and passes to the pump without contacting with the settlings in the trap.

It is therefore an object of the invention to provide a screen for a suction pipe leading to a pump that can be easily removed for cleaning and replaced with the minimum of trouble and time.

It is also an object of the invention to provide a control valve for the suction line of a spray pump outfit that can be removed for repairs or inspection with the minimum of time and trouble.

It is a further object of the invention to provide a sand or sediment trap for a spray tank outfit that will protect the screen from undue clogging during the periods of operation.

It is also an object of the invention to provide means for cleaning the residue from the sand trap without interfering with any other part of the apparatus.

It is also an object of the invention to provide a valve outfit for a spray tank that may be controlled from the top of the tank and from the outside.

With such objects in view as well as other advantages than those enumerated and which may be inherent in the invention, it is understood that the several necessary elements and combinations constituting the same may be varied in their proportions, placement and general arrangement without departing from the scope of the invention.

In order to make the invention more clearly understood, there are shown in the accompanying drawings in a more or less diagrammatic manner, means and mechanism for placing the same in concrete form without limiting the improvements in their application to the particular construction chosen to illustrate the invention.

Referring now to the drawings a better and clearer understanding of the invention will be had, wherein Figure 1 is a side sectional elevation showing the elements comprising the invention installed in a spray tank.

The numeral 1 represents the sand trap in general. 2 represents the opening passing to the suction pipe of the pump. 3 is the removable cap on the bottom of the sand trap, and 4 is the clamp holding the cap in place under normal operating conditions. 5 is the riser pipe. 6 is the screen member on the lower end. 7 is the valve. 8 is the valve stem. 9 is the pivoted handle on the top for controlling the position of the valve. 10 is the plate on the top that supports the valve stem and closes the opening for removing the valve and screen assembly for cleaning. 11 is the taper seat between the bottom of the screen member and the top end of the suction tube in the center of the sand trap.

The manner of manipulating this device in the operation of a spray outfit would be substantially as follows with the construction and arrangement as shown.

We will assume that the tank is empty and it is desired to start operation. The first step is to fill the tank with the desired spray liquid. A proper filling opening would be provided in the tank, not shown. Before filling the valve 7 would be lowered on its seat on the top of the tube 2 so that the agitation occasioned by the liquid falling into the tank would not wash any of the residue in the bottom of the tank down into the suction pipe which would find its way to the pump and valve rubbers as soon as the suction was started.

Figure 1:
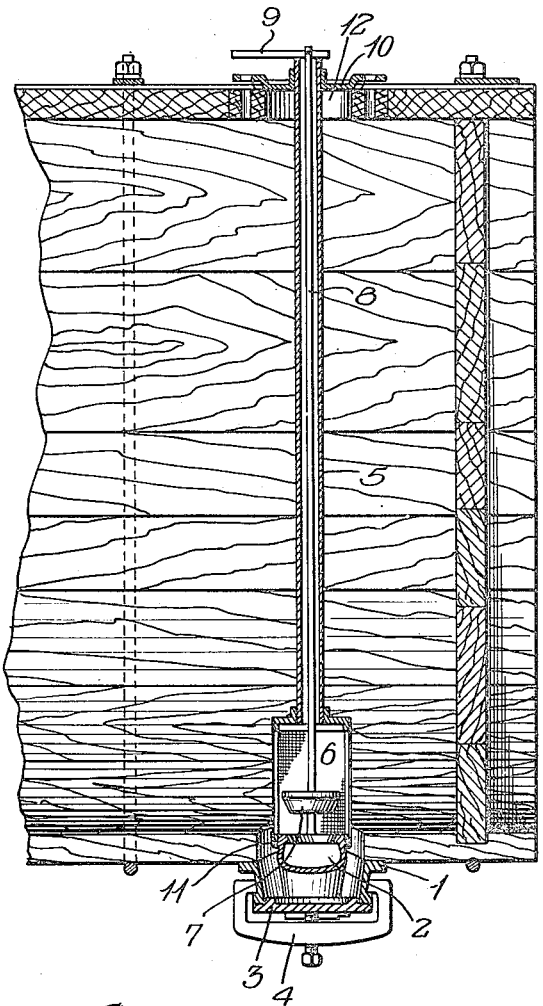
Figure 3:
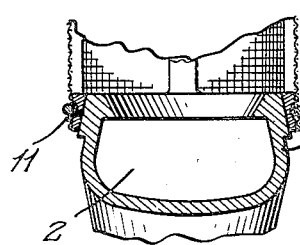
Figure 3 is an enlarged view of the valve alone to more clearly disclose its construction in relation to the screen and the manner of making a tight joint between them.
Figure 2:
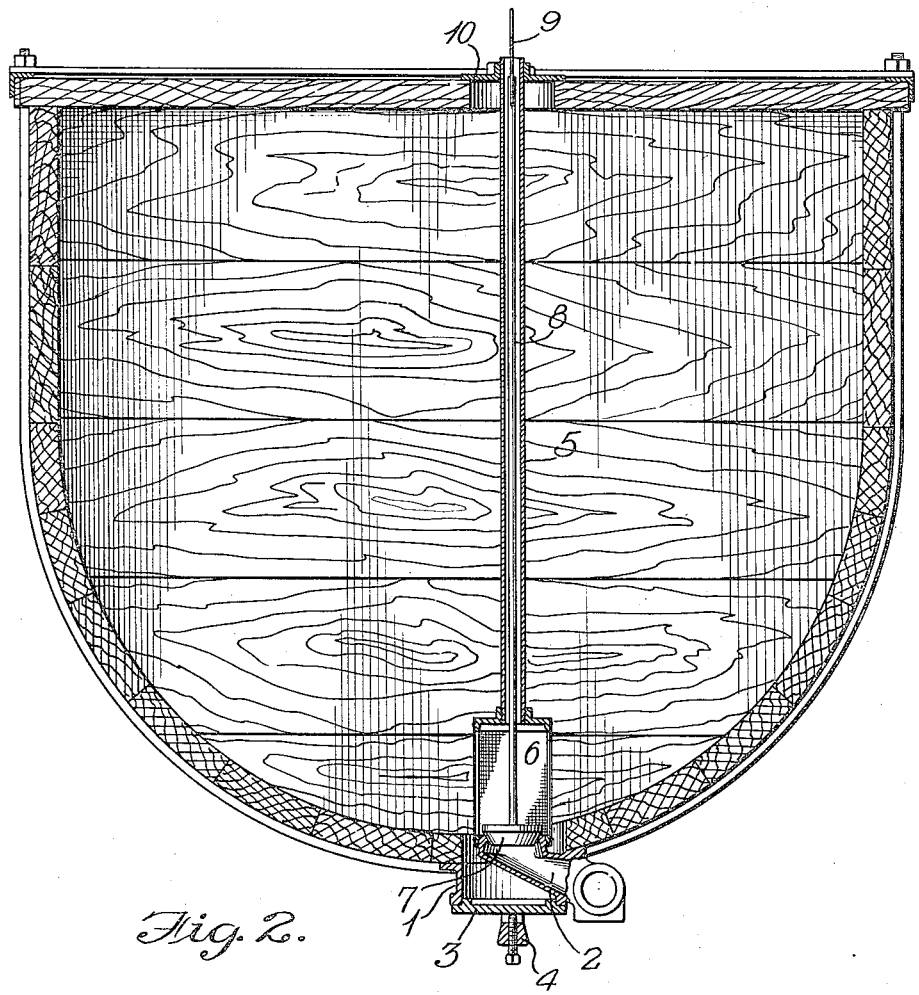
Figure 2 is a cross sectional elevation taken at substantially 90 degrees from that of Fig. 1.

After the tank has been filled and it is desired to start the pump the valve is lifted and locked in its open position as is illustrated in Fig. 1, wherein the pivoted handle 9 is placed at right angles to the valve stem and its two ends rested on the top of the riser pipe 5. The screen 6 is snugly fitted over the top end of the suction tube 2 so that no liquid or residue can pass except through the screen, and the screen is usually of a fine enough mesh to keep out the residue that does damage to the pump and fittings.

As the sand and dirt washed from the fruit or other material being treated settles in the bottom of the tank some of it will gradually follow the flow of liquid to the suction pipe and finding no means of coming in contact with the screen will settle in the sand trap, and in time this trap will fill and need cleaning so the residue will not pile up and clog the screen.

More or less very fine material will float in the liquid as it comes from treating a batch of fruit and some of the coarser material will lodge in the meshes of the screen and tend to clog it or at least somewhat interfere with a free flow of liquid so that it becomes necessary at intervals to remove the screen and clean it. This is accomplished by simply lifting the entire assembly of the riser pipe, the screen, the valve and stem entirely out of the tank through the large hole 12, which is most easily done and as easily replaced.

In replacing it is only essential that the lower end of the screen member is adjusted to its taper seat when everything will be centered for continued operation.

In the foregoing specification we have considered this invention as applied to fruit and vegetable washing machines wherein the solution is sprayed or flowed over the fruit and washes more or less of the dirt and residue therefrom which finds its way into the solution tank.

The invention is particularly adapted to the outfits for spraying trees and shrubs and other growing things and in this use the spray material always carries more or less of sediment and dirt of various sorts which must not reach the spray nozzles or they will be plugged up thereby and the efficient operation of the apparatus much hindered. In this operation none of the sprayed material is returned to the tank so that the sediment that must be screened from the spray nozzles is such that is always more or less present in spray materials.

Having thus described the invention what is claimed as new and is desired to secure by Letters Patent is:

1. An assembly for use in a spray tank comprising a sand trap, an integral section of a suction pipe, a removable screen member having a sealing ring for a liquid tight fit over a seat forming a part of said trap, a valve member substantially disposed in said screen member and also having a seat on said trap, a movable riser pipe connected to said screen member and extending to the top of the tank with means for holding the said riser pipe in position and a valve stem enclosed in said riser pipe and having a movable end portion to support said valve stem in a raised position with means on the bottom of said sand trap for facilitating cleaning.

2. An assembly for use in a spray tank to protect spray pumps and valve rubbers from undue wear and deterioration comprising a sand trap for positioning in the bottom of said tank, a portion of suction pipe forming an integral part of said trap, a removable valve and a screen member both having friction seating engagement with said portion of integral suction pipe, a riser pipe support for said screen and valve members extending to the top of the tank, a valve stem extending up through said riser pipe and having a manual device at the top for controlling the positioning of said valve relative to its seat.

3. A liquid control assembly for a spray or other tank comprising an integral sand trap and suction pipe, a screen member and valve member both having frictional engagement with said suction pipe, a riser pipe means extending from said screen to the outside of said tank for removing said screen from the tank for cleaning purposes.

4. A liquid control assembly for a tank comprising an integral sand trap and suction pipe, a screen member seated on said suction pipe and forming a friction liquid tight joint therewith, a riser pipe extending from said screen member to the outside of the tank for removing said screen member from the tank, a valve seated on the end of said suction pipe with a stem extending from said valve through said riser pipe to the outside of the tank for manipulating the said valve.

5. A control assembly for a tank for controlling the liquid supply to a pump comprising a sand trap and suction pipe formed of one piece of material with the suction pipe opening in the substantial center of the sand trap and extending angularly out of the side of the said trap, a screen member in frictional liquid tight operative relation with said sand trap and said suction pipe, a riser pipe extending from said screen member to the outside of said tank for removing said screen member from its operative position.

FLOYD A. HANSON.
FRANK H. LEWIS.